Aug. 27, 1963 R. O. GORDON 3,101,808
POWER TRANSMISSION
Filed March 23, 1959

INVENTOR.
RICHARD O. GORDON
BY
ATTORNEYS 3,101,808
                                                  Patented Aug. 27, 1963

3,101,808
POWER TRANSMISSION
Richard O. Gordon, Ypsilanti, Mich., assignor to Vickers Incorporated, Detroit, Mich., a corporation of Michigan
Filed Mar. 23, 1959, Ser. No. 801,042
8 Claims. (Cl. 180—79.2)

This invention relates to power transmissions and is particularly applicable to those of the type comprising two or more fluid pressure energy translating devices, one of which may function as a pump and another as a fluid motor.

This invention is generally concerned with an all hydraulic steering system which combines manually and power operated, hydraulic systems for steering the dirigible wheels of a vehicle.

More particularly, the invention relates to power transmissions adapted for use in servo applications such as power steering the dirigible wheels of a vehicle or actuating a control surface of an aircraft or missile.

As the automobile and truck, both commercial and industrial, have become larger, it has increasingly become more difficult to steer the vehicles with the conventional method of steering wherein power steering is an assist to the standard mechanical steering gear. The manufacturers have in some cases lowered the floor of the vehicle and reduced the overall working space of the vehicle in order to obtain a larger and roomier interior for the passengers. Added accessories have further complicated the space problem and have imposed various location and space limitations on the power steering designer and engineer.

In order to overcome the critical location and space problem and to provide a steering system that is as effortless as possible to operate, I have invented an all hydraulic steering system which has resulted in the elimination of the heavy, and inflexible mechanical steering gear, pitman arm, drag link, levers and related linkages and parts. This system has overcome many of the design limitations, especially in the industrial truck industry, and has permitted the designer and engineer more flexibility in locating the component parts of the system. The power steering booster can be mounted in any position in order to obtain the best thrust. The hydraulic lines are flexible hose rather than expensive forgings for linkages. The all hydraulic steering system has further provided a more compact system with fewer components than the standard system.

It is an object of this invention to provide an improved low cost, all hydraulic power steering system which utilizes standard hydraulic components so as to provide a system which is precisely controlled, rugged, compact and easy to maintain and disassemble for repairs.

It is a further object of this invention to provide an all hydraulic steering system wherein the conventional mechanical steering gear and related linkages have been eliminated.

Still a further object of this invention is to provide an all hydraulic steering system comprising a power steering circuit and a control and emergency hydraulic steering circuit which automatically comes into play to permit steering through the servo control cylinder in the event of power failure in the power circuit.

Another object of this invention is to provide a system wherein the reservoir of the power steering pump in the power circuit becomes the reservoir for the manual pump in the control circuit when steering manually.

Still another object of the invention is to utilize a hydraulic connection and servo control cylinder between the manual pump of the control circuit and the control valve of the power circuit, thereby actuating the control valve hydraulically rather than mechanically.

A further object is to eliminate the need for an accumulator in the control circuit.

A still further object of this invention is to provide positive means for supplying make-up fluid to the control circuit from the power circuit for replenishing the control circuit.

Still another object is to utilize the servo control cylinder in the control circuit as the servo actuator of the control valve regulating the flow in the power circuit.

Further objects and advantages of the present invention will be apparent from the following description, reference being had to the accompanying drawing wherein a preferred form of the present invention is clearly shown.

Figure 1:
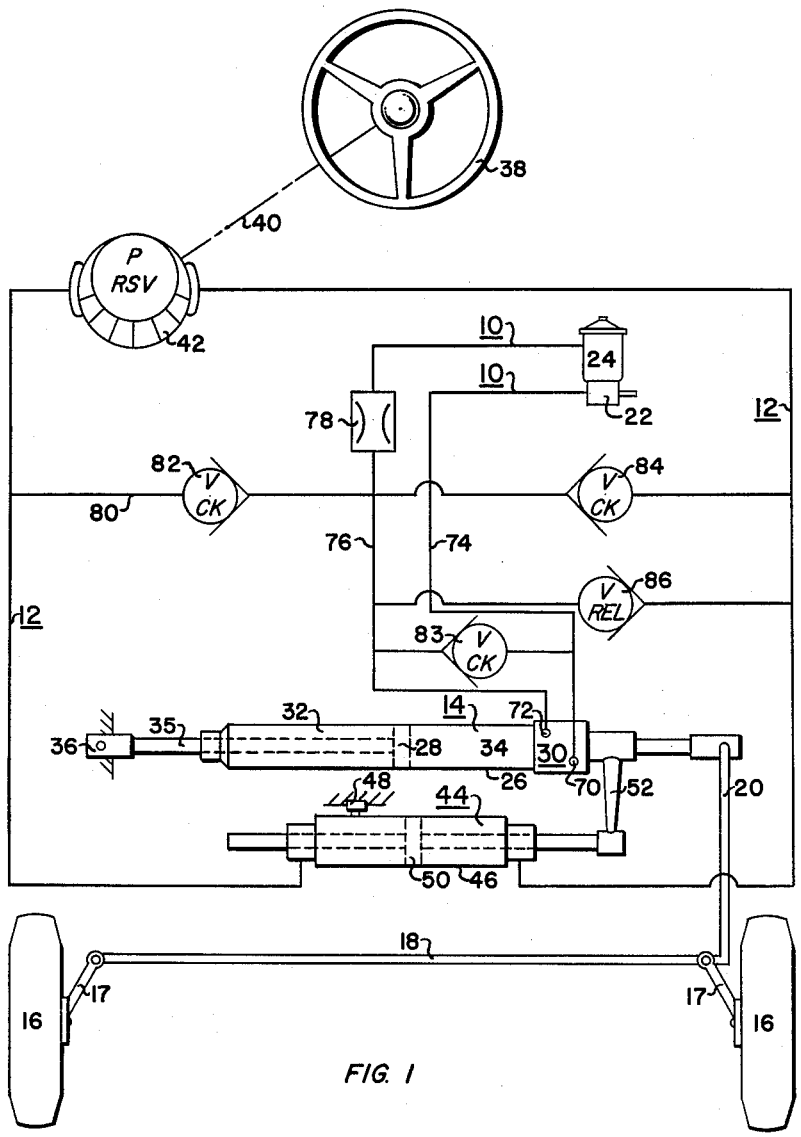
FIGURE 1 is a drawing showing the all hydraulic steering system.

Referring to the drawing and especially to the diagram of FIGURE 1, the all hydraulic steering system shown therein comprises two hydraulic circuits: a power circuit 10, and a control circuit 12. The primary purpose of the control circuit 12 is to supply sufficient pressure to actuate the control valve integrally formed with the hydraulic power steering booster 14, while the main purpose of the power circuit 10 is to deliver fluid through the control valve to the hydraulic power steering booster 14 so as to obtain the desired movement of the steered wheels 16.

The steered wheels 16 are connected by knuckle arms 17 to the tie rod 18. A connecting arm 20 joins the tie rod 18 to the cylinder of the hydraulic power steering booster 14 in a manner well-known in the art.

Figure 2:
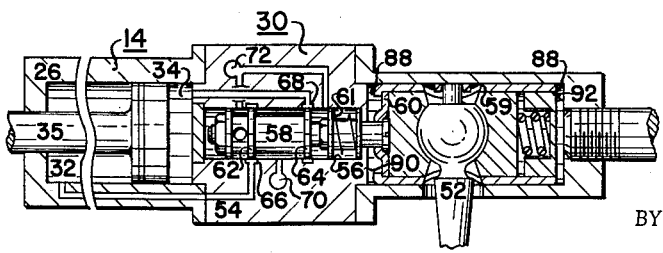
FIGURE 2 is a sectional view of the control valve which is integrally formed with the power steering booster.

The power circuit 10 consists in part of a power pump 22 which has an integral volume control and relief valve, not shown, and an oil reservoir 24. The power pump 22 may be of the type disclosed in the U.S. Patent No. 2,835,201 to R. B. Pettibone. The pump 22, which may be mounted in the vehicle engine compartment and belt driven from the crank shaft of the engine, not shown, delivers fluid under pressure to the power steering booster 14 included in the power circuit 10. The power steering booster 14 is of the double acting type and consists of a hydraulic cylinder 26 and a single ended, piston and rod assembly 28. A control valve 30 is located on the cylinder 26, as shown in FIGURE 2. The booster 14 may be of the type disclosed and described in the U.S. Patent No. 2,022,698 to Harry F. Vickers.

The rod and piston assembly 28 divides the double acting cylinder 26 into two chambers, the rod end 32 and the head end 34. The outer end of the rod 35 is fastened to the vehicle frame at 36, thereby permitting the cylinder 26 to follow-up and move relative to the piston and rod assembly 28.

The control circuit 12 is manually influenced and operated by the steering wheel 38 which has a driving connection, schematically represented by the line 40, with the rotor of the manually operated two-way actuator or reversible vane pump 42. Connected in the control circuit 12 along with the pump 42 is a servo control cylinder 44 of the double acting type, which consists of a cylinder 46 attached to the frame of the vehicle at 48, and a double ended piston and rod assembly 50 which moves in the cylinder 46 in response to the fluid delivered and controlled by the manual actuator pump 42 in the control circuit 12.

The piston and rod assembly 50 is coupled to the control valve 30 by the input link 52, thereby providing a servo connection for actuating the control valve 30, as will be explained hereinlater. The steering wheel 38 actuates the servo control cylinder 50 so as to move the control valve 30 in the desired direction.

The valve body 54 of the control valve 30 has a longitudinal bore 56 therein. The valve spool 58 moves axially in the bore 56 under the influence of the control pressure which acts to move the input link 52 and, in turn, the valve spool 58 in the same direction.

The input link 52 has a ball stud end which is inserted in the movable sleeve 59. An indented washer 60 is sandwiched between cooperating abutments on the sleeve 59 and connects the valve spool 58 to the link 52 such that movement of the link 52 produces a corresponding movement in the valve spool 58. The valve spool 58 is resiliently biased to a fixed position relative to the valve body 54 by a biasing spring and centering mechanism 61. It will be observed that whenever the valve spool 58 and the input link 52 are shifted from the illustrated position, a return force will be exerted thereon by the centering spring 61.

The valve spool 58 has a pair of valving lands 62 and 64 thereon. The valving lands 62 and 64 control a pair of motor ports 66 and 68 respectively. Ports 66 and 68 lead to opposite ends of the hydraulic power steering booster 14, with port 66 leading to chamber 32, and port 68 leading to chamber 34.

In the centered position of the spool valve 58 as illustrated, an open center condition exists. Pressure port 70 is in fluid communication with the return port 72 across lands 62 and 64. It is also apparent that the motor ports 66 and 68 are connected to the return port 72, when the spool valve 58 is in the centered position. Movement of the valve spool 58 in either direction will produce a pressure increase in one of the motor ports 66 or 68 in a manner well-known in the art, thus producing a hydraulic steering force at the booster 14.

A flexible inlet line 74 connects the power pump 22 to the inlet port 70, while a flexible conduit 76 connects the return port 72 to the reservoir 24. A restriction 78, creating a back pressure, is positioned in the return line 76 and is utilized to positively fill and replenish the control circuit 12.

Interconnected between the return line 76 and the control circuit 12 is a hydraulic connection 80 which has positioned therein a pair of opposed check valves 82 and 84. The connection 80 is located at a point upstream of the restriction 78 which maintains a back pressure on the check valves 82 and 84 such that a drop in pressure in the control circuit 12, due to leakage, permits fluid returning to the reservoir 24 to enter the control circuit 12 through the check valve 82 or 84.

It should be observed that no reservoir or accumulator is located in the control circuit 12 and that any make-up fluid is obtained from the power circuit 10 through the check valves 82 and 84. A relief valve 86 is connected between the control circuit 12 and the return line 76.

In operation, a counterclockwise rotation of the steering wheel 38 initially moves fluid in the control circuit 12 against the right hand end of the servo control cylinder 46 moving the piston and rod assembly 50 to the left. This movement produces a corresponding leftward movement of the valve spool 58, since both of said members are connected by the input link 52. Instantaneously, the power circuit directs fluid from the pump 22 to the inlet port 70, into the motor port 66, and on to the rod end chamber 32 of the hydraulic power steering booster 14. This causes the cylinder 26 to follow the movement of the valve spool 58 and move the wheels 16 through the connecting arm 20, which is connected to the cylinder 26.

Rotating the steering wheel 38 in a clockwise direction similarly moves the piston and rod assembly 50 of the servo control cylinder 46 to the right. This produces a corresponding movement of the valve spool 58 to the right. Power fluid is thereby directed from the pump 22 to the inlet port 70, motor port 68, and finally to the head end chamber 34 of the hydraulic power steering booster 14. As a consequence thereof, cylinder 26 moves to the right and rotates the wheels 16 through the connecting arm 20, thereby obtaining the desired steering of the vehicle.

It will now be apparent that the invention has provided an improved all hydraulic steering mechanism for many types of application wherein power operation of the steering or controlling element is accomplished under the precise control of the operator, the power operated mechanism being so constructed as to eliminate the standard steering gear and related linkages, thereby providing a compact and rugged steering arrangement which will efficiently carry out the desired steering operation with a minimum amount of effort and attention.

One or more manual pumps 42 may be placed in the control circuit 12 at different locations so as to permit steering from more than one position. This type of steering is frequently required in underground mine trucks as well as in certain boat applications, since the manual pump or actuator may be mounted in any direction and practically at any location.

An important feature of the invention is that manual hydraulic steering is provided through the servo control cylinder 46, when a power failure has taken place. This permits sufficient maneuverability of the vehicle for emergency purposes. When employing manual steering, the reservoir 24 of the power steering pump 22 becomes the reservoir of the manual pump 12. The check valves 82 and 84, previously described, permit oil to be drawn into the control circuit 12 from the reservoir 24, thereby eliminating the need for a reservoir or an accumulator in the control circuit 12.

The control valve 30 is not utilized when steering manually, since movement of the control valve 30 is limited by one of the clearances 88. When the power circuit 10 fails for any reason, the normal travel of the valve spool 58 creates no steering action. However, as the operator continues to turn the steering wheel 36 in either direction, the clearance 88 will be taken up. Mechanical abutment occurs by the outer edges of the sleeve 59 abutting the adjacent surface 90 or 92 depending on the direction of rotation. The manual steering force will be transmitted hydraulically through the control circuit 12 and servo cylinder 44 to the connecting arm 20.

For convenience purposes the check valve "n" disclosed and described in the U.S. Patent No. 2,022,698 to Harry F. Vickers has been located in the power circuit 10 external of the booster 14 as check valve 83. This check valve 83 is ordinarily held closed by the pressure of the inlet line 74. When the pressure has failed in the pressure circuit 10, the check valve 83 easily opens and permits circulation of oil between chambers 32 and 34 of the booster 14.

While the form of embodiment of the invention as herein disclosed has been applied to a steering system and constitutes a preferred form, it is to be understood that other forms might be adopted and would have widespread application for controlling an actuating movable surface such as utilized in the aircraft and missile industries. Other steering and controlling applications are to be further found in the boat and in the underground mine truck industries wherein one or a plurality of manual actuators may be utilized in the control circuit to provide steering from various strategic locations all coming within the scope of the claims which follow.

What is claimed is as follows:

1. A hydraulic power transmission comprising: a power circuit including a reservoir, a hydraulic power source, a fluid motor and a control valve for regulating flow from said power source to said fluid motor; a control circuit including a pump for supplying control fluid to move said control valve thereby directing fluid flow from the power source to the fluid motor; a return line in said power circuit for conducting displacement from said motor to said reservoir; means forming a hydraulic connection between said return line and said control circuit; and means in said return line for maintaining a pressure head on said control circuit through said hydraulic connection for replenishing the control circuit from the return line.

2. The hydraulic power transmission as defined in claim 1, wherein said means in the return line include a continuously open restriction for creating a back pressure in said hydraulic connection for replenishing the control circuit from the return line to the reservoir.

3. The hydraulic power transmission as defined in claim 2, wherein a check valve is located in said hydraulic connection and opens when the pressure in the control circuit decreases below a point determined by said check valve, said restriction creating the back pressure in the return line to replenish the control circuit through said check valve.

4. A hydraulic power transmission comprising: a power circuit including a reservoir, a power source, a fluid motor, a control valve for regulating flow from said power source to said fluid motor, and a return line for conducting displacement from said motor to said reservoir; a continuously open restriction in said return line; a control circuit including a pump to supply control fluid to move said control valve; and a hydraulic connection between said control circuit and said return line at a point upstream of said restriction, said connection including a check valve for supplyng replenishing fluid to said control circuit from said return line, when the pressure in the control circuit drops below a point determined by said check valve, said restriction creating a pressure head on said check valve to insure proper replenishing of the control circuit.

5. A combined power and manually operated hydraulic transmission comprising: an output member; an actuating cylinder mechanically coupled to the output member and including an integral shiftable valve member, said valve member having a limited movement of operation whereupon said valve is associated with said cylinder for mechanical actuation of the cylinder; a fluid supply source; a power operated pump; an open circuit hydraulically interconnecting the fluid source, pump, valve and cylinder, including a return line to said fluid source; a reversible fluid actuated control motor mechancially coupled to said control valve for actuating said valve to control power operation of the cylinder and also, in case of power failure, for actuating said cylinder; a reversible manually operated fluid pump; a closed circuit interconnecting said manually operated pump and control motor; conduit means interconnecting said closed circuit to said return line including a pair of check valves oppositely arranged in said conduit means; and means in said return line for maintaining a pressure head in said closed circuit.

6. A combined power and manually operated hydraulic transmission comprising: an output member; an actuating cylinder mechanically coupled to the output member and including an integral shiftable valve member, said valve member having a limited movement of operation whereupon said valve is associated with said cylinder for mechanical actuation of the cylinder; a fluid supply source; a power operated pump; an open circuit hydraulically interconnecting the fluid source, pump, valve and cylinder, including a return line to said fluid source; a reversible fluid actuated control motor mechanically coupled to said control valve for actuating said valve to control power operation of the cylinder and also, in case of power failure, for actuating said cylinder; a reversible manually operated fluid pump; a closed circuit interconnecting said pump and control motor; conduit means interconnecting said closed circuit to said return line; a pair of check valves oppositely arranged in said conduit means; and a continuously open restriction in said return line for creating a back pressure for replenishing the closed circuit.

7. A combined power and manually operated hydraulic transmission for driving a load device comprising: a double acting actuating cylinder mechanically coupled to the load device and including an integral shiftable valve member of the open center type for controlling the directional operation of the cylinder, said valve member having a limited movement of operation whereupon said valve is associated with said cylinder for mechanical actuation thereof; a fluid reservoir; a power operated pump; an open circuit interconnecting the fluid reservoir, pump, valve and cylinder, including a return line for conducting pump and cylinder displacement to the reservoir respectively in the open center and cylinder operating positions of the valve member; a reversible fluid actuated control motor mechanically coupled to said shiftable valve member for actuating said valve member for power operation of the cylinder and, also, in case of power failure for operation of the valve member beyond its limited movement of operation to actuate the cylinder; a reversible manually operated fluid pump; a closed circuit interconnecting the manually operated pump and control motor; and conduit means connecting the return line to the closed circuit on opposite sides of the manually operated pump and including a pair of oppositely arranged check valves, whereby upon power failure the manually operated pump is supplied with fluid from the reservoir in the open circuit for actuation of the double acting cylinder.

8. A combined power and manually operated hydraulic transmission for driving a load device comprising: a double acting actuating cylinder mechanically coupled to the load device and including an integral shiftable valve member of the open center type for controlling the directional operation of the cylinder, said valve member having a limited movement of operation whereupon said valve is associated with said cylinder for mechanical actuation thereof; a fluid reservoir; a power operated pump; an open circuit interconnecting the fluid source, pump, valve and cylinder, including a return line for conducting pump and cylinder displacement to the reservoir respectively in the open center and cylinder operating positions of the valve member; a reversible fluid actuated control motor mechanically coupled to said shiftable valve member for actuating said valve member for power operation of the cylinder and, also, in case of power failure for operation of the valve member beyond its limited movement of operation to actuate the cylinder; a reversible manually operated fluid pump; a closed circuit interconnecting the manually operated pump and control motor; conduit means connecting the return line to the closed circuit on opposite sides of the manually operated pump and including a pair of oppositely arranged check valves, whereby upon power failure the manually operated pump is supplied with fluid from the reservoir in the open circuit for operation of the double acting cylinder; and a continuously open restriction in the return line for creating a back pressure, whereby said closed circuit is replenished from the return line in the open center and operating positions of the valve member.

References Cited in the file of this patent

UNITED STATES PATENTS

| | | |
|---|---|---|
| 2,020,951 | Lemon | Nov. 12, 1935 |
| 2,022,698 | Vickers | Dec. 3, 1935 |
| 2,252,660 | Kulikoff | Aug. 12, 1941 |
| 2,506,093 | MacDuff | May 2, 1950 |
| 2,786,454 | Bertsch | Mar. 26, 1957 |
| 2,860,719 | Furches | Nov. 18, 1958 |